May 25, 1965    L. A. OSBORNE ETAL    3,185,605
METHODS OF MAKING RESIN REINFORCED ARTICLES
Filed Aug. 19, 1960    4 Sheets-Sheet 1
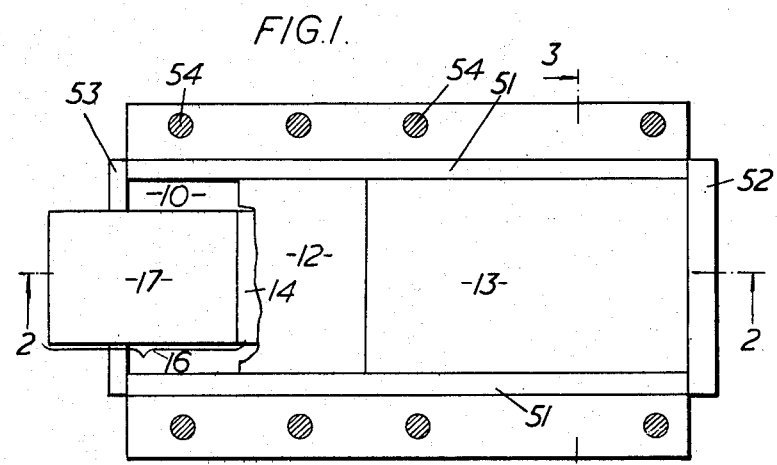
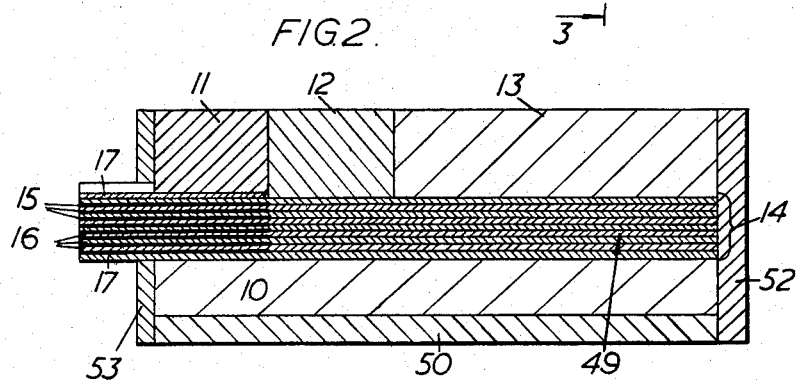
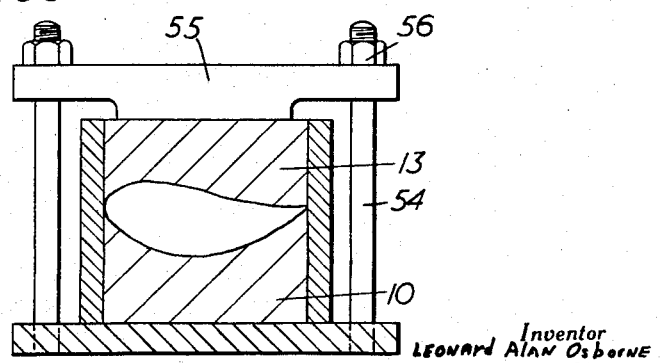
Inventor
LEONARD ALAN OSBORNE
VICTOR GEORGE RIVERS
By
Bailey, Stephens & Huettig
Attorneys May 25, 1965      L. A. OSBORNE ETAL      3,185,605
METHODS OF MAKING RESIN REINFORCED ARTICLES
Filed Aug. 19, 1960      4 Sheets-Sheet 2

Inventor
Leonard Alan Osborne
Victor George Rivers

By
Bailey, Stephenson Huettig
Attorneys

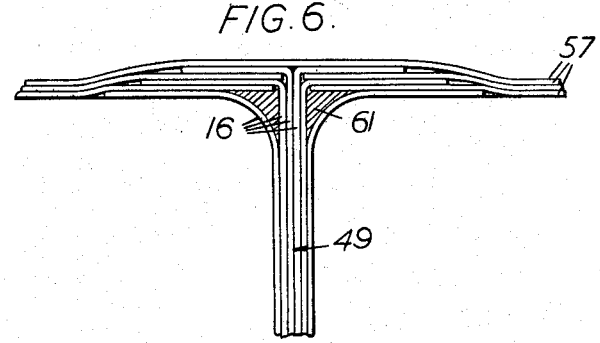
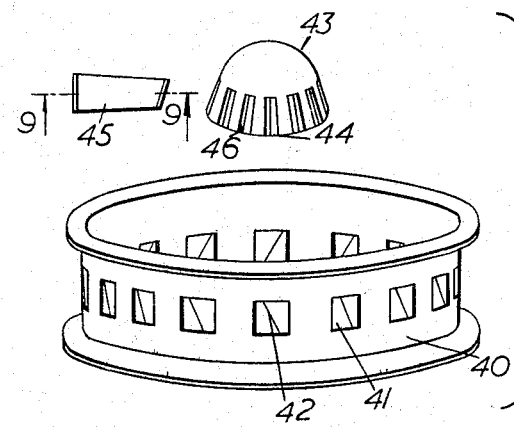
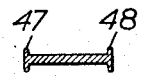

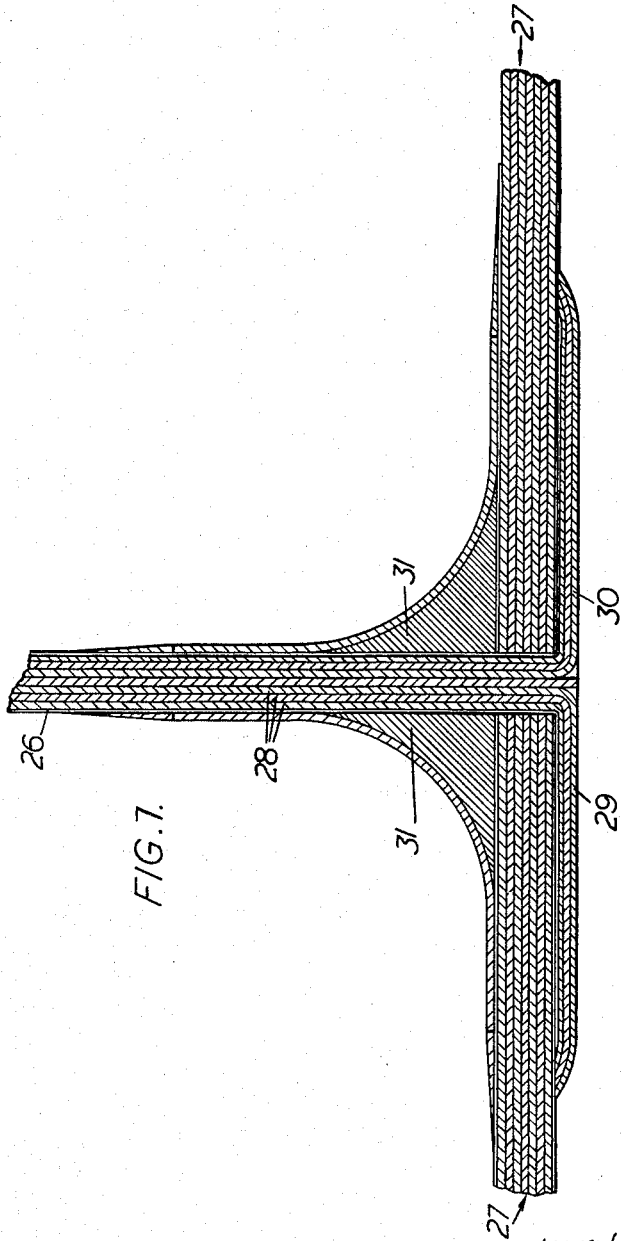

United States Patent Office 3,185,605
Patented May 25, 1965

3,185,605
METHODS OF MAKING RESIN REINFORCED ARTICLES
Leonard Alan Osborne and Victor George Rivers, Bristol, England, assignors to Bristol Siddeley Engines Limited, Bristol, England, a company of Great Britain
Filed Aug. 19, 1960, Ser. No. 50,793
Claims priority, application Great Britain, Aug. 21, 1959, 28,713/59
11 Claims. (Cl. 156—289)

This invention relate to articles made from resin in which are reinforcing laminations.

According to the invention a component consisting of laminations of flexible reinforcing material which over part of their area are bonded together into a rigid body by resin by which they have been impregnated, and which over the remainder of their area are substantially resin-free and are flexible, is made by a method in which the laminations are placed together, and in that part which is to remain substantially resin-free the laminations are interleaved with thin flexible impermeable sealing sheets of material to which the resin will not readily adhere, then the interleaved lamination parts and sheets are pressed tightly together and the remaining area of the laminations is impregnated with the resin while pressure on the interleaved lamination parts and sheets is maintained, and after the resin has set the pressure is released and the sealing sheets are removed. The resultant resin-free part of the laminations may then be employed in attaching the component to another member, which may be a support.

In particular, a resin-impregnated laminated article provided at one end with resin-free lamination parts as described above may be attached to another member by causing the resin-free parts to overlap the other member, and impregnating with resin the overlapping part and member to join them together.

The other member may be laminated and the resin-free lamination parts be caused to enter between the laminations of the other member in interleaved fashion.

Among advantages of the use of the present invention are that the resin-free lamination parts are readily bent to form a neat connection and readily interleaved with other laminations to form a particularly strong joint. Moreover when the resin-free parts are later impregnated, the resin which enters becomes, after setting and curing, a homogeneous whole with the resin in any interleaved or overlapped laminations.

When making a partly-impregnated component according to the invention, one or more interleaved zones may be prepared to give terminal and/or intermediate attachment parts which are resin-free. If the terminal part is long, it will suffice to interleave and clamp a zone nearest the impregnated part. Where intermediate resin-free parts are required, an interleaved sealing zone must be provided on each side of the intermediate part and suitably compressed to exclude the resin.

Examples of the invention will now be described with reference to the annexed diagramamtic drawings in which:

FIGURE 1 is a plan of a partially closed mould containing a stack of glass fibre cloth laminations shaped to form a guide vane of aerofoil shape, a terminal part of the laminations protruding from one end of the mould, which is open for that purpose;

FIGURE 2 is a section on the line 2—2 in FIGURE 1 and shows the laminations partly interleaved with flexible sealing sheets;

FIGURE 3 is a section on the line 3—3 in FIGURE 1, omitting the laminations;

FIGURES 4 to 6 are diagrams illustrating successive stages in the assembly of a vane into a duct wall;

FIGURE 7 is a section through another form of junction between a vane and a duct wall;

FIGURE 8 is a diagrammatic view of the components of a ring of guide vanes; and

FIGURE 9 is a section on the line 9—9 in FIGURE 8.

Figure 4:
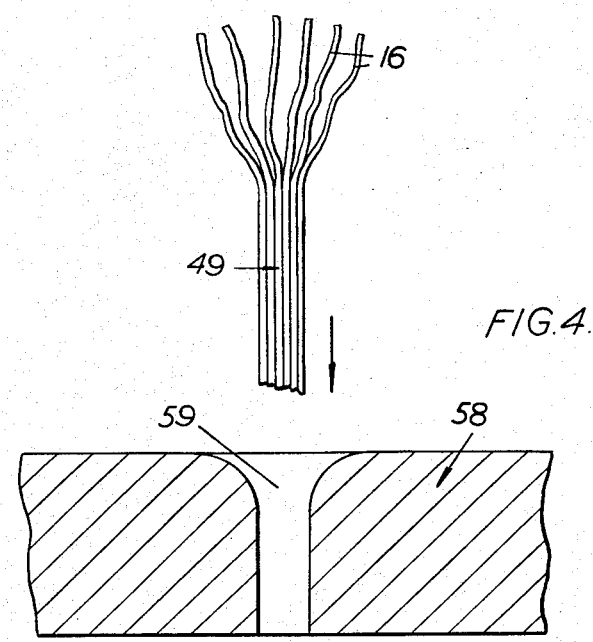

Referring to FIGURES 1 to 3, the mould comprises a female die 10, in a housing made of parts 50, 51, 52, 53, fixed together, and a male die which is divided transversely into three separate sections, 11, 12, 13, each provided with clamping means 54, 55, 56 (FIGURE 3) for clamping the sections downwards onto the female die. The mould is shaped to produce an article of aerofoil section for use as a guide vane in an air duct. In a manner which will be described later, the resin is prevented from entering an area of the mould covered by the male die section 11, so that only a partially moulded guide vane is produced. The end of the mould adjacent to the die section 11 is open.

The female die 10 is loaded with appropriately shaped laminations 14 of glass fibre cloth, the open end of the mould permitting the adjacent ends of the laminations to protrude therefrom. A number of thin flexible sealing sheets 15, for example of polyvinylchloride, are interleaved with the protruding end parts 16 of the cloth laminations 14 so as to enter the adjacent open end of the die and extend inwards as far as the vertical plane containing the inner end of the die section 11. Sealing sheets 17 of rubber are placed against the outer surfaces of the top and bottom laminations 14.

The die section 11 is then placed in position and screwed down to clamp the interleaved laminations 14 and sealing sheets 15 tightly together between the rubber sheets 17. A suitable polyester resin is then introduced into the mould through the still partially open top to impregnate that portion of the stacked laminations which is not interleaved with the sealing sheets 15, after which the main die section 13 of the male die is located in position and screwed down. Surplus resin lying on the top lamination may then be removed from the impregnated zone adjacent the interleaved zone, e.g. by means of brushes, and finally the remaining section 12 of the male die is also placed in position and screwed down to complete the mould, as shown, in FIGURE 2. The resin is then allowed to set and cure at room temperature, preferably for about twenty-four hours.

During impregnation and subsequent setting and curing in the mould, the resin is prevented from entering the interleaved zone and impregnating the end parts 16 because of the clamping action exerted by the die section 11, combined with the sealing action of the flexible sealing sheets 15 and 17 which under the clamping action of the die section 11 form a seal not only between each adjacent pair of laminations but also enter the interstices between the warp and weft of each cloth lamination. This combined clamping and sealing action prevents impregnation of the end parts 16 to any substantial distance. That is to say creeping of the resin by capillary action along the laminations is blocked or restricted to a small distance, and any air remaining trapped between the sealing sheets resists the entry of resin.

When curing has been completed, the mould is opened, and the partly moulded vane is removed in the form of a component comprising a moulded vane 49 of glass-fibre-reinforced resin having a root part for attachment purposes which is composed of a plurality of unimpregnated loose end parts 16 of laminations from which the sealing sheets 15 and 17 are then removed.

Although glass fibre cloth is the preferred form of lamination, other forms of lamination may be used, for example knitted cloth, felted fibres, parallel threads, and paper.

The sheets 15 may be of other material, for example polyethylene, provided that they are impermeable, that they do not react with the cloth laminations or with the resin employed in the mould, and that they are easily removable when required from the cloth laminations. They must be sufficiently thin (for example of the order of 0.006 inch thick) and flexible so as to enter the interstices between the warp and weft of the laminations.

The upper and lower rubber sheets 17 form an intimate sealing contact with the top and bottom cloth laminations respectively when clamped between the male and female dies of the mould, and they also permit a smaller clamping pressure to be employed than would otherwise be necessary to exclude the resin from the interleaved zone, thereby reducing any risk of rupture of the cloth laminations.

It is not essential for there to be alternate laminations and sealing sheets. There may be several laminations between adjacent sealing sheets.

Figure 5:
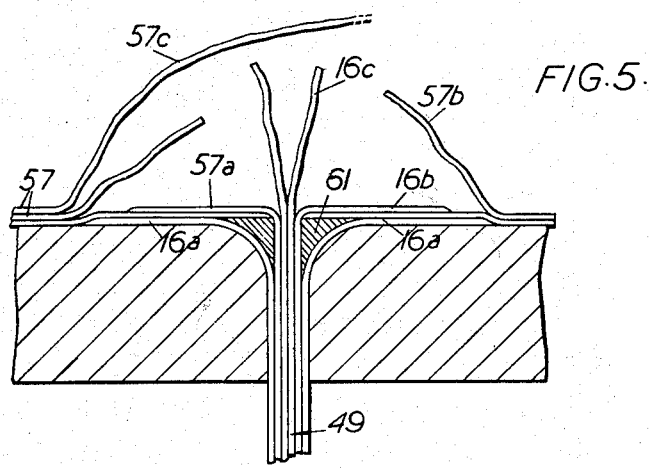

One way in which the guide vanes may then be attached at right angles to the wall of an air duct is shown in FIGURES 4 to 6. The duct is constructed by laying laminations of glass fibre cloth 57 around a core 58, which may be of plaster. There are slots 59 in the core, and before application of the laminations 57 begins, the vanes 49 are pushed into the slots, as indicated by the arrow 60 in FIGURE 4. Note that FIGURES 4 to 6 are diagrammatic in that they show a smaller number of laminations than would be used in practice.

The outer end of the slots 59 is bellmouthed, and the two outer laminations 16a are laid down onto the core following the contour of the bellmouth as shown in FIGURE 5. Then glass roving 61 is packed in at each side of the vane, to form a solid fillet. Next the first lamination 57a of the wall of the duct is laid onto the core, overlapping the laminations 16a and the roving 61. Then pairs of laminations 16b and 16c are bent away from one another, alternating with additional wall laminations 57b. Finally continuous laminations 57c are laid in place over the laminations 16c and 57b.

The attachment lamination parts 16 of the vanes and the laminations 57 of the duct wall, and the roving 61, are impregnated with a polyester resin which is allowed to set and cure at room temperature. The duct then comprises a wall of glass-fibre-reinforced resin from which extend inwards a number of guide vanes rigidly connected to the laminated duct wall. The final construction of the duct, after removal of the core, is shown in FIGURE 6.

FIGURE 7 shows a somewhat similar connection between one of a number of vanes 26 and a laminated duct wall 27, but in this arrangement the laminations of the duct wall are first placed on the core (not shown) with a slot between adjacent pieces of lamination in line with the slot in the core. Then the loose lamination parts 28 of each vane 26 are passed right through the slot in the laminations of the duct wall 27, and are then divided into two groups 29, 30 which are bent back to extend in opposite directions and overlap the outer surface of the duct wall 27. The laminations of the duct wall and the lamination parts 28 of the vanes 26 are impregnated with resin which is allowed to set and cure at room temperature to join the guide vanes to the duct wall. Reinforced resin fillets 31 are also added, preferably after removal of the core, to strengthen the attachment of each vane to the duct wall.

FIGURES 8 and 9 show the assembly of guide vanes 45 between a ring 40 and a hub 43. In this case, the ring 40 is made separately by moulding laminations of glass fibre, impregnated with resin which is allowed to set and cure. The ring has resin-free areas 41 and the laminations are interleaved with sealing sheets. After the ring has been removed from its mould, the areas 41 are slit through at 42. This allows the sealing sheets to be removed, and leaves flabby lamination parts on both sides of the slit. In the same way the hub is moulded with resin-free areas 44, slit at 46.

The vanes 45 are moulded separately, and have rigid enlarged end 47, 48 which serve as attachment portions. In final assembly, the ends 47, 48 are pushed partly through the slits 42, 46, and the flabby lamination parts are then impregnated with resin and manipulated to closely engage, and nearly enclose, the ends 47, 48. The parts are held in relative position by a jig or mould while the resin sets and cures to produce an integral structure.

We claim:

1. A securing a vane to a tube wall, the vane being formed from laminations of flexible reinforcing material which over limited portions of their area are substantially resin-free and are flexible, while over the remaining area they are bonded together into a rigid body by resin by which they have been impregnated, in which each vane is made by a method which comprises placing the laminations together in a stack, interleaving limited portions only of the laminations with thin flexible impermeable sealing sheets of material to which the resin does not adhere, then pressing the interleaved laminations and sealing sheets tightly together and impregnating the area of the laminations other than said interleaved laminated portions with resin while maintaining sufficient pressure on the interleaved laminated portions to leave such interleaved laminated portions resin-free, setting the resin and then releasing the pressure and removing the sealing sheets; forming a tube having free laminations parts, holding the resin-impregnated part of the vane stationary, arranging the resin-free portions of the vane at an angle to the plane of the resin-impregnated portions extending on both sides thereof, overlapping the resin-free parts with free lamination parts of the tube wall, impregnating the overlapped parts with resin, and setting the resin in order to join the vanes integrally to the tube wall to form a rigid body.

2. A method of making a component comprising laminations of flexible reinforcing material which over limited portions of their area are substantially resin-free and are flexible, while over their remaining area they are bonded together into a rigid body by a resin, which comprises placing the laminations together in a stack, interleaving limited portions only of the laminations with thin flexible impermeable sealing sheets of material to which the resin does not adhere, then pressing the interleaved laminations and sealing sheets tightly together and impregnating the area of the laminations other than said interleaved laminated portions with resin while maintaining sufficient pressure on the interleaved laminated portions to leave such portions resin-free, setting the resin and then releasing the pressure and removing the sealing sheets.

3. A method according to claim 2 in which the interleaved laminated portions and sealing sheets alternate.

4. A method according to claim 2 in which the sealing sheets are of polyvinylchloride.

5. A method according to claim 2 in which the interleaved laminated portions and sheets are pressed between outer sealing sheets of resilient impermeable material.

6. A method according to claim 2 in which the impregnated area is enclosed in a mould and subjected to moulding pressure, and the moulding pressure and the sealing pressure are maintained until the resin is fully cured.

7. A method according to claim 2 in which the resin-free laminated portions are at one end of the component.

8. A method of making an article of reinforced resin in which a component is made by a method according to claim 2, the resin-free laminated portions are then overlapped with additional lamiantion, and the overlapped parts are impregnated with resin which is allowed to set to become a rigid body integral with the rigid body of the component.

9. A method according to claim 8 in which the resin-free laminated portions are interleaved with the additional laminations.

10. A method according to claim 8 in which the body of the component is at right angles to the adjoining parts of the article, and the resin-free laminated portions are in two groups bent away from one another.

11. A method according to claim 10 in which a fillet of resin and additional reinforcement is formed at the junction of the two bodies.

References Cited by the Examiner

UNITED STATES PATENTS

| 2,342,023 | 2/44 | Vidal et al. | 244—120 |
| 2,748,048 | 5/56 | Russell | 156—289 |

FOREIGN PATENTS 787,260  12/57  Great Britain.

ALEXANDER WYMAN, *Primary Examiner.*

CARL F. KRAFFT, EARL M. BERGERT, *Examiners.*